United States Patent Office 3,280,159
Patented Oct. 18, 1966

3,280,159
PROCESS FOR PREPARING 21-METHYL-20-KETO-17α,21-DIHYDROXY STEROIDS
Masato Tanabe, Palo Alto, Calif., assignor to Schering Corporation, Bloomfield, N.J., a corporation of New Jersey
No Drawing. Filed May 12, 1965, Ser. No. 455,335
2 Claims. (Cl. 260—397.45)

This application is a continuation-in-part application of my co-pending application Serial No. 289,732, filed on June 21, 1963, now abandoned, which application is a continuation-in-part of the then-co-pending application Serial No. 132,543, filed August 27, 1961, now U.S. Pat. No. 3,116,289, which application in turn is a continuation of then co-pending applications Serial Nos. 845,594, 845,595 and 845,661, all filed on October 12, 1959; applications Nos. 845,594, 845,595 and 845,661 are all now abandoned.

This invention relates to compositions of matter identified as 21-methyl corticoids and to methods for their manufacture.

The invention sought to be patented in one of its composition aspects is described as residing in the concept of a chemical compound having the molecular structure of a 3,20 - diketo - 17α,21 - dihydroxy-11-substituted-1,4-pregnadiene (and the lower alkanoyl esters thereof) characterized by the presence of a methyl group attached to the 21-position and wherein the 11-substituent is keto, (H, OH) or halogen. Other groups may be present elsewhere in the nucleus preferably a fluoro group at the 9-position although this position may contain other halogen substituents. It is a requisite that when there is a halogen in the 11-position that there be a halogen in the 9-position. At the 2-position there may be H or methyl, at the 6-position there may be H, methyl or halogen (preferably fluoro or chloro), at the 16-position there may be H, lower alkyl (preferably methyl), lower alkylidene (preferably methylene), or hydroxy.

In another of its composition aspects, the invention sought to be patented is described as residing in the 1,2-dihydro analogs of the foregoing.

The invention sought to be patented in its process aspect is described as residing in the concept of hydrolyzing a 21-methyl-3,20-diketo-17α,21-alkylidenedioxy-1,4-pregnadiene (or 4-pregnene) with acid so as to produce the 21-methyl-17α,21-dihydroxy pregnenes described above.

A more specific and more limited aspect of the composition sought to be patented may be described as residing in steroids having the following formula:

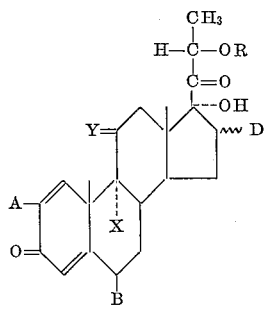

including the 1,2-dihydro analogs thereof wherein A is a member of the group consisting of H and methyl; B is a member of the group consisting of H, methyl and halogen; D is a member of the group consisting of H, lower alkyl and lower alkylidene, X is a member of the group consisting of hydrogen and halogen, Y is a member of the group consisting of O, (H, OR) and halogen, with the proviso that when Y is halogen, X is halogen and R is a member of the group consisting of H and acyl. The acyl group being that of hydrocarbon carboxylic acid having up to 12 carbon atoms.

In the foregoing formula the wavy line connecting a substituent to the nucleus denotes that both epimeric forms are included. For example, at the 16-position, it is meant to include both the 16α-methyl and 16β-methyl substituent. At the 6-position, likewise, the α- and β-forms are included within the scope of the invention.

The novel compounds of my invention possess adrenocortical properties and are useful in the alleviation of inflammation and inflammatory diseases such as arthritis. Many steroids having structures similar to the formula set forth above pharmacologically exhibit anti-inflammatory activity. It has been found with my novel compounds bearing a methyl group at the 21-position the mineralocorticoid effect is considerably diminished. Although the glucocorticoid response may be diminished by the presence of the 21-methyl group, the ratio of glucocorticoid to mineralocorticoid effect is increased. Thus, my novel compounds provide a means for eliciting an anti-inflammatory effect with marked diminution or elimination of the usually undesirable mineralo effects. Accordingly, I have provided a means for modifying the adverse salt effects of 9α-fluoroprednisolone (or its acetate) by formation of a 21-methyl analog.

The novel compositions are prepared, in the ultimate, from a 3,20-diketo-17α,21-dihydroxy-11-substituted-1,4-pregnadiene (or 4-pregnene) which may have other nuclear substituents as set forth herein. This 17α,21-dihydroxy steroid starting material is transformed into its 17α,21-isopropylidinedioxy derivative (or other alkylidenedioxy analog) according to the method described in my copending application Serial No. 132,543, filed August 21, 1961, now U.S. Pat. No. 3,116,289, of which this application is a continuation-in-part. Alkylation of the 17α,21 - isopropylidenedioxy derivative (or other 17α,21-acetonide analog) with a methylating agent in the presence of a basic catalyst results in the formation of a 21-methyl analog of the 17α,21-acetonide. Suitable methylating agents are those embraced by the generic expression $CH_3T$, wherein T represents a leaving-anion such as halides, sulfates, and aromatic sulfonates. Specifically preferred methylating agents are such compounds as methyl chloride, methyl iodide, methyl bromide, dimethyl sulfate, p-methyltoluenesulfonate, p-methylbromobenzenesulfonate, methyl benzenesulfonate, and the like. Suitable basic catalysts are such strongly basic substances as alkali metal lower alkoxides, alkali metal hydrides, alkali metal amides, and alkali metal tri-aryl alkanes and the like. Specifically preferred agents are such compounds as potassium butoxide, sodium methoxide, sodium hydride, lithium hydride, potassium hydride, sodamide, potassamide, lithium amide, sodium tri-phenylmethane, potassium tri-phenylmethane and other such equivalently functioning agents readily apparent to one of ordinary skill in the art. In practice it is preferred to employ at least one mole equivalent of base to steroid. Acid hydrolysis of the 21-methyl-17α,21-acetonides afford the novel compounds of this invention. Useful acids for effecting hydrolysis of the 17α,21-acetonide are such aqueous (50%) carboxylic acids as formic acid, acetic acid, propionic acid, butyric acid, isobutyric acid, oxalic acid, trifluoroacetic acid, trichloracetic acid, and such dilute (5%) mineral acids as hydrochloric acid, hydrobromic acid, hydriodic acid, sulfuric acid, nitric acid, phosphoric acid, boric acid and the like. In practice it is preferred to employ the aqueous acid in amounts of about 25 parts to each part (by weight) of steroid. This reaction sequence is fully described in my aforementioned parent application and is set forth below as follows:

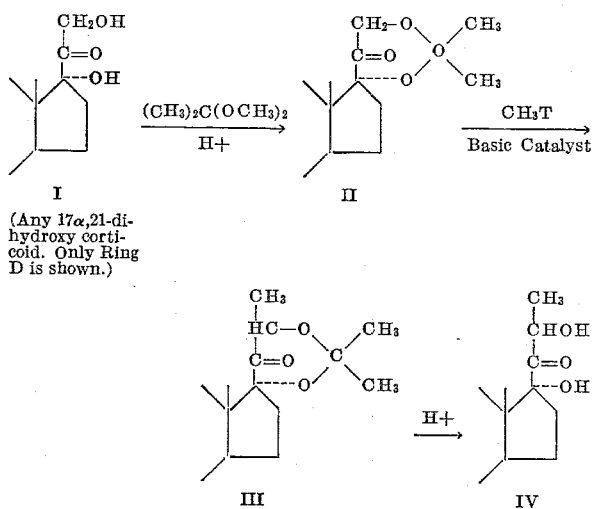

(Any 17α,21-dihydroxy corticoid. Only Ring D is shown.)

wherein T is defined as above.

The final product (IV) can now be transformed into a 21-ester by any of the conventional esterification methods.

The following examples are illustrative of the method for preparing the novel compounds of this invention.

EXAMPLE 1

21-methylprednisolone

Dissolve 2.0 g. of prednisolene in 4 cc. of dimethylformamide and 15 cc. of 2,2-dimethoxypropane, add a crystal of p-toluenesulfonic acid and reflux six hours. Remove the solvents in vacuo and dissolve the residue in benzene. Adsorb the solution on 40 g. of acid-washed alumina and elute with benzene and chloroform-benzene 1:2. Evaporate the eluates, combine and crystallize from acetone, yielding 17α,21 - isopropylidenedioxy-1,4-pregnadiene-11β-ol-3,20-dione, M.P. 243–247°, $[\alpha]_D^{23}$ +106° (chloroform).

Prepare a solution of potassium t-butoxide from 700 mg. of potassium in 50 cc. of t-butanol and add 1.0 g. of 17α,21 - isopropylidenedioxy-1,4-pregnadiene-11β-ol-3,20-dione. To the solution add 15 ml. of methyliodide and then reflux under a nitrogen atmosphere with stirring for two hours. Pour into water and extract with chloroform. Dry the chloroform solution over sodium sulfate and concentrate in vacuo. Crystallize the residue from acetone to yield 17α,21-isopropylidenedioxy-21-methyl-1,4-pregnadiene - 11β - ol - 3,20 - dione, M.P. 245°, $[\alpha]_D^{23}$ +93° (chloroform).

A solution of 612 mg. of 17α,21-isopropylidenedioxy-21-methyl-1,4-pregnadiene-11β-ol-3,20-dione in 10 cc. of acetic acid and 10 cc. of water is heated on a steam bath under a nitrogen atmosphere for 1.5 hours. The solution is then concentrated in vacuo and the residue crystallized from acetic acid and ether and recrystallized from acetic acid to yield 21-methylprednisolone, M.P. 129–133°, $[\alpha]_D^{24}$ +56° (chloroform).

EXAMPLE 2

21-methylprednisolone 21-acetate

Prepare a solution of 100 mg. of 21-methylprednisolone in 1 ml. of pyridine and 1 ml. of acetic anhydride and allow to stand overnight. Remove solvents in vacuo and crystallize the residue twice from acetone-hexane to yield 21-methylprednisolone 21-acetate, M.P. 218–224°, $[\alpha]_D^{24}$ +97° (chloroform).

EXAMPLE 3

9α-fluoro-16α,21-dimethylprednisolone

Reflux a solution of 500 mg. of 9α-fluoro-16α-methylprednisolone in 2 ml. of dimethylformamide, 3 ml. of 2,2-dimethoxypropane and 25 mg. of p-toluenesulfonic acid for twelve hours. Concentrate to dryness in vacuo and then dissolve the residue in benzene. Filter and adsorb the filtrate on 10 g. of magnesium silicate and elute with benzene-ether, 1:1. Evaporate the eluates to dryness, combine and crystallize from ether-methylene chloride to yield 9α-fluoro-16α-methyl-17α,21-isopropylidenedioxy-1,4-pregnadiene-11β-ol-3,20-dione, M.P. 263–264°, $[\alpha]_D^{23}$ +83° (chloroform).

To a solution of 290 mg. of potassium in 100 ml. of dry t-butanol add 802 mg. of 9α-fluoro-16α-methyl-17α, 21-isopropylidenedioxy - 1,4 - pregnadiene - 11β - ol-3,20-dione. After the steroid is completely dissolved at room temperature, add 20 ml. of methyliodide and stir the mixture at room temperature for 15 minutes under a nitrogen atmosphere. Pour the solution into water and extract the mixture with chloroform. Dry the chloroform extracts over sodium sulfate and concentrate to dryness in vacuo. Crystallize the residue from methylene chloride-ether and recrystallize from acetone to yield 9α-fluoro-16α,21-dimethyl - 17α,21 - isopropylidenedioxy-1,4-pregnadiene-11β-ol-3,20-dione, M.P. 252–258°, $[\alpha]_D^{31}$ +72 (chloroform).

Heat a solution of 90 mg. of 9α-fluoro-16α,21-dimethyl-17α,21 - isopropylidenedioxy-1,4-pregnadiene-11β-ol-3,20-dione in 7 cc. of 50% formic acid for two hours on a steam bath under a nitrogen atmosphere. Add water and concentrate the solution to dryness in vacuo. Crystallize the residue twice from methylene chloride and dry in vacuo at 140° to yield 9α-fluoro-16α,21-dimethylprednisolone, M.P. 243–246°, $[\alpha]_D^{29}$ +79 (chloroform).

EXAMPLE 4

9α-fluoro-16α,21-dimethylprednisolone 21-acetate

Allow a solution of 350 mg. of 9α-fluoro-16α,21-dimethylprednisolone in 2 ml. of pyridine and 2 ml. of acetic anhydride to stand overnight. Remove the solvents in vacuo and crystallize the residue from methanol to yield 9α-fluoro-16α,21-dimethylprednisolone 21-acetate, 160 mg., M.P. 235–240°.

In the foregoing procedure for the manufacture of 21-methyl analogs of corticoids, Examples 1 and 3, the steroid reactant is transformed into its 21-methyl counterpart. Thus, by substituting any one of the following corticoids for prednisone in the method of Example 1, the corresponding 21-methyl analog is obtained: prednisone, 9α-halogeno-prednisone (especially 9α-fluoro), 9α-halogeno-prednisolone (especially 9α-fluoro), 2-methylprednisone, 2-methylprednisolone, 6α-methylprednisone, 6α-fluoroprednisolone, 6α-fluoroprednisone, 16-methyleneprednisone, 16-methylene-prednisolone, 16α-methylprednisone, 16α-methylprednisolone, 16β-methylprednisone, 16β-methylprednisolone, triamcinolone, dexamethasone, betamethasone, 16-methylene-9α-fluoroprednisolone, 6α-fluoro-16-methyl (α and β)-prednisone, 6α-fluoro-16-methyl (α and β)-prednisolone, 6α-fluorodexamethasone, 6α-fluorobetamethasone, 6α-methyldexamethasone, 6α-methylbetamethasone, 6α,16α-dimethylprednisolone, 6α, 16β-dimethylprednisone, 9α,11β-dihalo analogs of 1-dehydro-Reichstein's Compound S (especially the chloro analogs), 6α-fluoro-9α,11β-dihalo (especially dichloro)-1-dehydro Reichstein's Compound S and the like including the 1,2-dihydro analogs. It is evident that any anti-inflammatory steroid having a 17α,21-dihydroxy group, regardless of other nuclear substituents which may be present are convertible into the corresponding 21-methyl analog. This invention contemplates such conversion and such product.

Examples 2 and 4 are given by way of illustration of a method for making 21-esters of the 21-methyl corticoids of this invention. Other common hydrocarbon carboxylic esters having 2 to 12-carbon atoms are prepared in similar fashion such as the propionate, cyclopentylpropionate, benzoate, succinate (hemi-ester), enanthate, and inorganic esters such as phosphate (and dihydrogen phosphate) are prepared from the 21-ol by methods well known in the art.

I claim:
1. In the process for the manufacture of a 21-methyl-20-keto-17α,21-dihydroxy compound of the pregnane series, the steps which comprise alkylating a 20-keto-17α,21-alkylidenedioxy compound of the pregnane series with a methylating agent selected from the group consisting of methyl halides, sulfates and aromatic sulfonates, in the presence of a basic catalyst selected from the group consisting of alkali metal lower alkoxides, alkali metal hydrides, alkali metal amides, and alkali metal tri-aryl alkanes and subjecting the product formed thereby to the action of aqueous acid selected from the group consisting of aqueous mineral acids and aqueous carboxylic acids.

2. In the process for the manufacture of a 21-methyl-20-keto-17α,21-dihydroxy compound of the pregnane series, the steps which comprise alkylating a 20-keto-17α,21-alkylidenedioxy compound of the pregnane series with a methyl halide in the presence of an alkali metal lower alkoxide and hydrolyzing the product so formed by means of aqueous formic acid.

References Cited by the Examiner
UNITED STATES PATENTS 2,915,434   12/1959   Agnello et al. _____ 167—77

OTHER REFERENCES

Fieser et al.: Steroids (1959), pp. 686, 691 and 694, Reinhold Pub. Co., New York.

LEWIS GOTTS, *Primary Examiner.*

HENRY A. FRENCH, *Assistant Examiner.*